United States Patent [19]

van der Meulen

[11] Patent Number: 5,047,999
[45] Date of Patent: Sep. 10, 1991

[54] OPTICAL RECORD CARRIER READER CALCULATING TRACK PITCH AND WRITE VELOCITY FOR LOCATING READ POINT

[75] Inventor: Meine J. P. van der Meulen, Oss, Netherlands

[73] Assignee: U.S. Philips Corporation, New York, N.Y.

[21] Appl. No.: 232,401

[22] Filed: Aug. 15, 1988

[30] Foreign Application Priority Data

Aug. 17, 1987 [NL] Netherlands ................ 8701925

[51] Int. Cl.$^5$ ............................................ G11B 7/085
[52] U.S. Cl. ....................................... 369/32; 369/50; 369/58; 369/111
[58] Field of Search ............... 369/17, 32, 50–51, 369/58, 111, 124; 358/342

[56] References Cited

U.S. PATENT DOCUMENTS

| | | | |
|---|---|---|---|
| 3,662,353 | 5/1972 | Chertok | 369/51 X |
| 4,340,949 | 7/1982 | Kelleher | 369/32 X |
| 4,578,786 | 3/1986 | McIntosh et al. | 369/51 X |
| 4,759,007 | 7/1988 | Eberly | 369/51 X |
| 4,829,497 | 5/1989 | Sako et al. | 369/50 |

OTHER PUBLICATIONS

Patent Abstracts of Japan, vol. 9, No. 177, p. 375, 7/23/85, & JP 60-50676.
Patent Abstracts of Japan, vol. 11, No. 49, p. 547, 2/14/87, & JP 61-216181.

Primary Examiner—Aristotelis M. Psitos
Assistant Examiner—W. R. Young

[57] ABSTRACT

In order to displace the light beam to a position on the disc determined by a given address code on an optically readable record carrier having information provided with address codes and recorded in substantially concentrical tracks for the purpose of accurate reading, the track pitch and the write velocity with which the information has been recorded on the relevant disc is determined prior to reading. The light beam is displaced from a position with a known address code successively across a given first and second number of tracks and the address code is read after each displacement. The track pitch and the write velocity are calculated from the data obtained so that the relation between the track number and the address code is accurately established.

2 Claims, 2 Drawing Sheets

OPTICAL RECORD CARRIER READER CALCULATING TRACK PITCH AND WRITE VELOCITY FOR LOCATING READ POINT

BACKGROUND OF THE INVENTION

The invention relates to an apparatus for reproducing information recorded at a given write velocity in substantially concentrical tracks on an optically readable record carrier wherein, the information includes an address code as a measure of the radial position on the record carrier. The apparatus comprises:

an optical read device for directing a light beam towards the record carrier, and the light beam is modulated by the information;

a detection device for supplying a signal modulated in conformity with the modulated light beam;

a signal processing device for deriving an output signal and for deriving address codes from the signal of the detection device;

a radial displacer for displacing the light beam in a radial direction across the record carrier, and a controller for at least controlling the radial displacer, whilst for displacing a position with a known address code to a position with a desired address code the light beam is displaced across a plurality of tracks which is dependent on the desired and the known address codes, the write velocity and the track pitch.

Generally such an apparatus will be an apparatus for optically reading records on which information provided with addresses recorded in a spiral track or in a plurality of concentrical tracks. Such an apparatus may be particularly a Compact Disc Digital Audio disc player or briefly CD player for playing digital audio discs or a Compact Disc Read Only Memory player or simply CD-ROM player for playing digital data discs.

In addition to the actual audio information so-called sub-code information is also recorded on a digital audio disc wherein the sub-code information includes, inter alia an absolute time code expressed in minutes, seconds and frames (1/75 s) which indicates the time elapsed from the start of playing the disc.

This time code is used as an address code in order to bring the spot of the light beam to a desired radial position on the disc. In most commercially available CD-players, this address code is exclusively used for finding the beginning of the music tracks on the disc. In fact, the absolute time codes of the beginning of the music tracks present on the record, expressed in minutes and seconds, are indicated on the lead-in track of an audio disc. Since seconds are not sufficiently accurate to find the beginning of a music track, use is made of the relative time code also incorporated in the sub-code signal and indicating the time elapsed from the beginning of each music track. In addition to searching for the beginning of music tracks by using the absolute time code, some players have a facility to directly program an arbitrary absolute time code so that the spot of the light beam can be moved to any arbitrary position on the disc and any arbitrary music track can be played.

In both cases the desired position is achieved in the same manner. The number of tracks across which the spot of the light beam must be displaced to reach the desired position is calculated from the absolute time code of the beginning of a desired music track and the absolute time code of the position from which a jump must be made. The comparison indicating the relation between the number of tracks to be jumped and the absolute time code is dependent on the track pitch and the velocity with which the information has been recorded on in particular disc. In accordance with the worldwide adopted Compact Disc Standard, this write velocity must be between 1.2 and 1.4 m/s and the track pitch must be between 1.5 and 1.7 $\mu$m. The actual write velocity and track pitch of an arbitrary disc to be played are, however, not known. In order to prevent the spot of the light beam from overshooting the desired position and, in the worst case, from overshooting the lead-out track of the disc, the minimum write velocity and the maximum pitch are used as a basis for the calculation of the number of tracks to be jumped.

However, the result thereof is that jumping to desired address is not very accurate so that in most cases a number of jumps must be made in order to reach the desired address. After one jump the light beam may still be situated 800 to 1000 tracks before the track with the desired absolute time code.

The absolute time code on a CD-ROM disc is not only present in the sub-code signal but also at the start of each data block. The various data blocks can now be read by searching the relevant absolute time code in the data. The Philips CD-ROM player CM 100 incorporates a table stating the associated track number for each minute. The number of tracks to be jumped from a given address to the address of the data block to be read is determined by means of this table. In order to prevent overshoot of the desired position, the table stored in the player is based on the minimum write velocity and the maximum track pitch. This means that also in a CD-ROM player jumping to a desired position is not very accurate so that the searching time is relatively long.

SUMMARY OF THE INVENTION

It is therefore an object of the invention to provide an apparatus with which the light beam can be displaced in a relatively accurate and fast manner to a given address code. According to the invention an apparatus of the type described in the foregoing is characterized in that the controller is provided with a calculator means for calculating the track pitch and the write velocity of the relevant record carrier by means of the address codes obtained after displacement of the light beam from a first position with a known address code successively across a first and a second number of tracks.

The measures according to the invention provide the possibility of determining the track pitch and the write velocity of each separate disc. Subsequently, the number of tracks which is to be jumped to reach a desired address code can be accurately calculated for the relevant disc. It has been found that one jump, short of approximately 10 tracks from the track with the desired address code is made by means of the apparatus according to the invention.

BRIEF DESCRIPTION OF THE DRAWING

The invention will now be described in greater detail by way of example with reference to the accompanying drawings, in which.

DETAILED DESCRIPTION OF PREFERRED EMBODIMENTS

Figure 1:
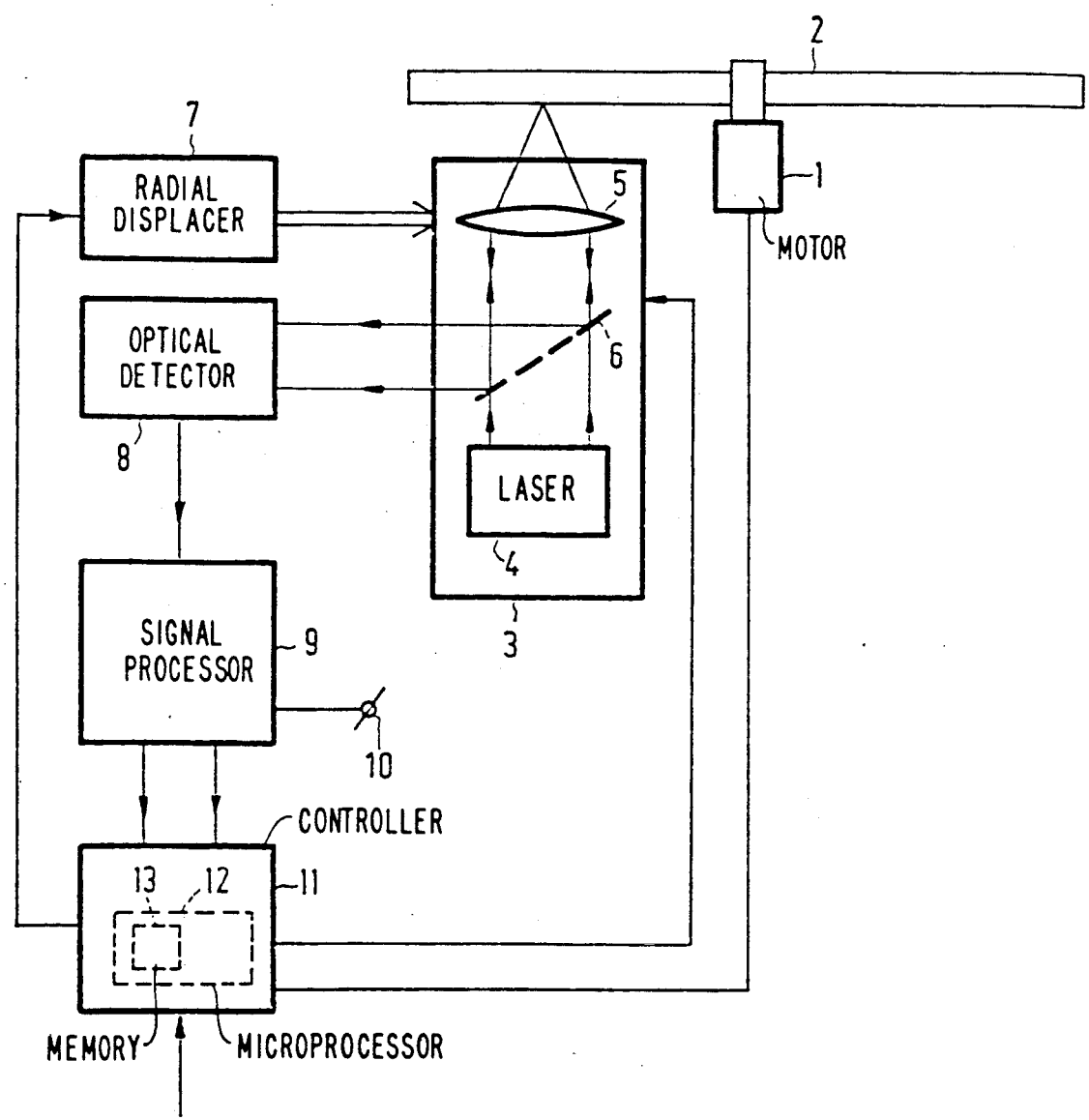
FIG. 1 is a block diagram of an apparatus according to the invention.

FIG. 1 is a block-schematic diagram of an apparatus according to the invention in which only the elements required to explain the operation of the invention are shown. The apparatus comprises a motor 1 with which an optically readable disc 2 can be rotated. The disc is, for example a digital audio disc on which digital audio information in the form of a spiral track of pits separated by intermediate areas is provided. For reading the information use is made of an optical system 3 which is provided with a laser 4 whose beam is focussed on the disc 2 by means of a lens system 5 which is shown diagrammatically. The spot of the beam may be displaced radially across the disc 2 by radial displacer 7 which may be, for example in the form of an arm which can be rotated about a shaft by means of a motor or a slide which can be displaced radially by means of a motor, while at least a portion of the optical system 3 is arranged on the arm or the slide. The disc 2 is rotated about the shaft and the optical system 3 is moved in the radial direction in such a manner that the laser beam follows the information track with a constant linear velocity. The laser beam is modulated by the information structure on the disc 2 and the beam reflected by the disc is applied via a semi-transparent mirror 6 to an optical detector 8 which converts the modulated light beam into a correspondingly modulated electric signal. This signal is applied to a signal processing device 9 which derives the digital audio signal therefrom after demodulation and error correction, which signal is applied to output 10. In the signal processor 9, a plurality of control signals is also derived from the detector signal, which control signals are applied to a control device 11. These control signals are used, inter alia to cause the motor to rotate at the desired number of revolutions, to keep the beam focussed on the disc 2 and to control the radial displacer in such a way that the beam continues to follow the information track accurately.

In addition to audio information also so-called sub-code information incorporating, inter alia the number, titles and composers of the music tracks and an absolute and a relative time code, are recorded on the disc 2. The absolute time code is a code continuously extending along the track indicating the absolute time from the beginning of the track and the relative time code is a code indicating the absolute time from the beginning of a music track. After demodulation in the signal processing device 9 the sub-code information is applied to the control means 11 provided with a microprocessor 12, in which means this information can be reproduced, for example on a display. Commands can be given to the controller 11 with which the various functions and facilities of the player are initiated.

The absolute time codes of the beginning of the music tracks on the disc are indicated on the lead-in track of an audio disc. After starting the player these time codes are stored in a memory 13 of the microprocessor 12. Since it must be possible to record a maximum number of 99 music tracks on a disc in accordance with the compact disc standard, only the minutes and seconds are indicated in the lead-in track. Since this does not provide the possibility of accurately finding the beginning of a music track, a jump to a position slightly beyond the beginning of a music track is first made by using the absolute time code whereafter the beginning of a track is searched by means of the relative time code. In addition some commercially available compact disc players provide the facility of directly programming an absolute timecode in minutes, seconds and frames so that jumps can be made to any arbitrary position.

In both cases, the beam is displaced by the radial displacer 7 in the same manner on the basis of the absolute time code. The relation between the absolute time code t and the number of tracks N which is counted in a radially outward direction is given by:

$$t = \frac{2\pi r_0 N}{v} + \frac{\pi s N^2}{v} \quad (1)$$

wherein:
$r_0$ = the radius of the inner audio track which, according to the compact disc standard, is fixed at 25 mm from the center of the disc.
$v$ = the write velocity with which the information is recorded on the disc, and
$s$ = the track pitch of the tracks on the disc.

With this equation, it follows that the track number on which a given time code is present:

$$N = \frac{((2\pi r_0)^2 + 4\pi v s t)^{\frac{1}{2}} - 2\pi r_0}{2\pi s} \quad (2)$$

From the track numbers associated with the absolute time codes of the starting position and the desired position the microprocessor 12 calculates the number of tracks across which the displacer 7 should displace the spot of the beam radially across the disc 2 in order to reach the desired position.

As is evident from the equation above, this number of tracks is dependent on the write velocity and the track pitch of the relevant disc. The compact disc audio standard prescribes that the write velocity should be $1.2 \leq v1 \leq 1.4$ m/s and the track pitch should by $1.5 \leq s \leq 1.7$ μm. The actual value are, however, unknown for an arbitrary disc to be played. To prevent overshoot far beyond the desired position or even beyond the lead-out track of the disc, the calculation of the number of tracks to be jumped is always based on the minimum write velocity and the maximum pitch. A number of jumps must therefore usually be made to reach the desired address.

According to the invention, the accuracy of jumping to a given position is increased by determining both the track pitch and the write velocity of a disc. To this end, a three-point measurement is performed under the control of the microprocessor 12. Firstly, a first jump of a known number of tracks $N_1$ is made from a position with a known absolute time code $t = t_0$ on an unknown track $N = N_0$, whereafter the time code $t_1$ of the track reached is read and subsequently a second jump of a known number of tracks $N_2$ is made, whereafter the time code $t_2$ of the track reached is also read again. The time codes $t_0$, $t_1$, $t_2$ and numbers of tracks $N_1$ and $N_2$, when substituted in equation 1, yield two equations from which the write velocity and the track pitch S can be solved in a simple manner.

With these data, the number of the track on which a given time code is present can now be calculated accurately from equation 2. The number of tracks which is to be jumped to reach a given position can be accurately calculated therewith.

The three-point measurement may be performed after the disc is started and before a start is made while reading the actual audio information. The first jump can be made for example, from the position with time code t=o on track N=o. However, it is alternatively possible to jump from an arbitrary different position. For example, one can go first to the position with time code to =2 sec. A positive time code has the advantage that it can be found more quickly than the time code t=o. Each jump may be equal to, for example, 5000 tracks, but they may also be unequal to one another. The three-point measurement may not only be performed prior to reading, but also with the aid of jumps made during normal operation of the apparatus. As already described, a number of jumps is usually required in the known apparatus so as to displace the light beam from a given address code to a desired address code. For the first jump the number of tracks to be jumped is then calculated from the known address code and the desired address code. After the first jump the address code reached is read and compared with the desired address code. If these codes differ considerably, a second jump is made, while the number of tracks to be jumped is calculated from the desired address code and the address code reached after the first jump. After the second jump the address code reached is read again. If necessary, more jumps are made to reach the desired address code. In the same way as described above, the write velocity and the track pitch of the relevant disc can be calculate from the number of tracks of the first and the second jump and from the address codes prior to the first jump and after the first and the second jump.

Figure 2:
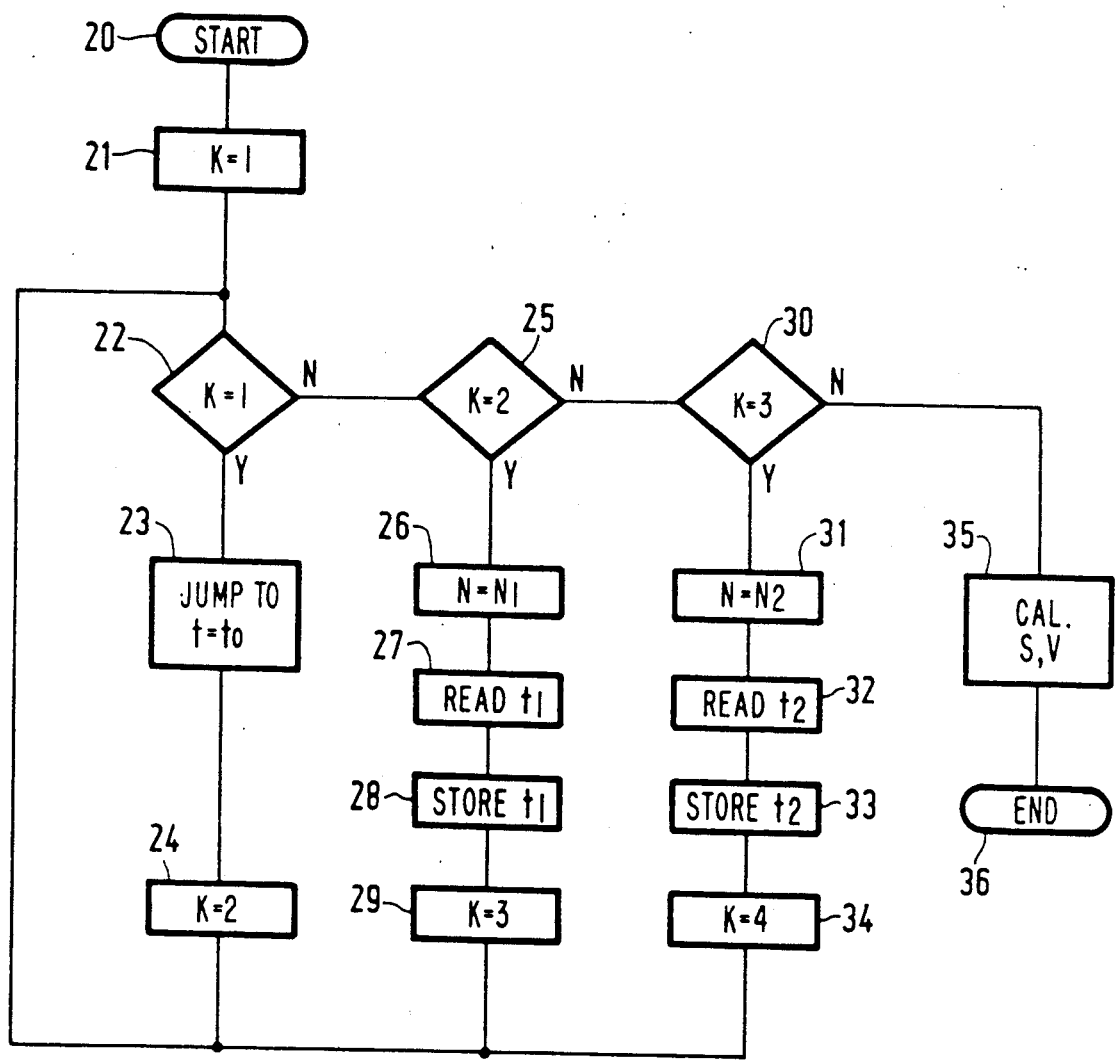
FIG. 2 is a flow chart of the program performed by the controller of FIG. 1.

FIG. 2 provides the flow chart of the program performed by the microprocessor 12 in the controller 11 to determine the write velocity V and the track pitch S of a disc. In block 21, legend "k=1" a variable k is set at the value 1. After it has been checked in block 22, legend "k=1?", whether k has indeed the value of 1, a jump is made in block 22, legend "jump to t=to", to the track with time code to, for example $t_o=2$ S. After this jump the value of k is set at 2 in block 24, legend "k=2", and a return is made to block 22. Then a jump is made to block 25, legend "k=2?", and subsequently a jump is made over N tracks in block 26, legend "jump $N_1$". After this jump the time code of the track reached, which is stored in a memory 13 of the microprocessor 12 in block 28, legend "store $t_1$", is read in block 27, legend "read t". After the value of k is set at 3 in block 29, legend "k=3", a jump is made back to block 22 whereafter a jump is made over $N_3$ tracks in block 31, legend "jump $N_2$" via blocks 25 and 30. The time code $t_2$ of the track reached, which is stored in the memory 13 of the microprocessor is block 33, legend "store t2", is then read in block 32, legend "read $t_2$". After the value of k is set at 4 in block 34, legend "k=4", a jump is made back to block 22 whereafter a jump is made via the blocks 25 and 30 to block 35, legend "calculate S, V", in which the track pitch S and the write velocity V are calculated from the data to; $N_1$, $t_1$ and $N_2$, $t_2$ and equation 1.

In an embodiment not shown the program can be performed once again after the track pitch S and the write velocity V have been calculate, with two jumps over a different number of tracks being made from the same starting position of the same number of tracks as with the first time being jumped from a different starting position. The track pitch S and the write velocity V are again calculated from the data obtained, whereafter the arithmetical mean value of the two results is determined. It is of course alternatively possible to perform the programme more than twice.

The invention has been described with reference to an apparatus for playing digital audio discs in which the absolute time code is present in the sub-code information. The apparatus of FIG. 1 may, however, alternatively be suitable for playing digital data discs. The only difference is that the absolute time code on such discs is not only present in the sub-code information but also in the actual data. In fact, the absolute time code is used as an address to be able to read the different data blocks. Jumping to a given absolute time code in order to read a specific data block is, however, effected in the same manner as with an audio disc.

The apparatus according to the invention is suitable for reading any type of optically readable record carrier in which information provided with address codes is recorded. Instead of using the time code as a position code, it is of course possible to use any other code which is representative of the position on the disc.

| LEGEND to FIG. 2. | |
|---|---|
| Block no: | Legend: |
| 20 | start |
| 21 | k=1 |
| 22 | k=1? |
| 23 | jump to $t=t_o$ |
| 24 | k=2 |
| 25 | k=2? |
| 26 | jump $N=N_1$ |
| 27 | read $t_1$ |
| 28 | store $t_1$ |
| 29 | k=3 |
| 30 | k=3? |
| 31 | jump $N=N_2$ |
| 32 | read $t_2$ |
| 33 | store $t_2$ |
| 34 | k=4 |
| 35 | calculate S,V |
| 36 | end |

What is claimed is:
1. An apparatus for reproducing information recorded at a given write velocity in substantially concentrical tracks on an optically readable record carrier, the information including an address code as a measure of radial position on the record carrier, said apparatus comprising:

an optical read device for directing a light beam towards the record carrier, the light beam producing radiation from the record carrier which is modulated by the information recorded thereon;

a detector for producing a signal which is modulated in response to the modulated radiation from the record carrier;

a signal processor for deriving an output signal and for deriving address codes from the signal of the detector;

radial displacement means for displacing the light beam in a radial direction across the record carrier, and controlling means for at least controlling the radial displacement means so as to displace the light beam from a position on the record carrier having a known address code to a second position thereon having a second address code by displacing the light beam across a plurality of tracks, such displacement being dependent on the second address code and the known address code, the write velocity and the track pitch; the controlling means having calculating means for calculating the track pitch and the write velocity of the record carrier using address codes obtained from the record carrier displacement of the light beam from the first position with the known address code successively across a first and a second number of tracks.

2. The apparatus according to claim 1, wherein the calculating means is adapted to calculate the track pitch and the write velocity using the address codes of the positions obtained after displacement of the light beam and the write velocity using the address codes obtained from the record carrier by displacement of the light beam from the second position with the second address code successively across a third and a fourth number of tracks; and the calculating means is further adapted to calculate the arithmetical means value of the calculated values of the track pitch and the write velocity.

from the second position with the second address code successively across a third and a fourth number of tracks and the calculating means is adapted to calculate the arithmetical means value of the calculated values of the track pitch and the write velocity.

* * * * *